(12) United States Patent
Couture

(10) Patent No.: US 7,235,900 B1
(45) Date of Patent: Jun. 26, 2007

(54) SWITCHING APPARATUS AND METHOD FOR VARYING A PHASE LINE IMPEDANCE OF AN ELECTRIC POWER TRANSPORT LINE SECTION

(75) Inventor: Pierre Couture, Boucherville (CA)

(73) Assignee: Hydro-Québec, Montréal, Québec (CA)

( * ) Notice: Subject to any disclaimer, the term of this patent is extended or adjusted under 35 U.S.C. 154(b) by 386 days.

(21) Appl. No.: 10/416,488

(22) PCT Filed: Nov. 14, 2000

(86) PCT No.: PCT/CA00/01348

§ 371 (c)(1),
(2), (4) Date: Jul. 14, 2003

(87) PCT Pub. No.: WO02/41459

PCT Pub. Date: May 23, 2002

(51) Int. Cl.
*G05F 1/10* (2006.01)
(52) U.S. Cl. .................. 307/98; 307/115; 307/147; 361/1; 219/482; 219/490
(58) Field of Classification Search ................ 307/125, 307/147, 112, 113, 144, 115, 98, 99; 219/482, 219/490; 361/1
See application file for complete search history.

(56) References Cited

U.S. PATENT DOCUMENTS

| | | | |
|---|---|---|---|
| 2,240,772 A | 5/1941 | Hampe et al. | |
| 2,797,344 A | 6/1957 | Peirce | |
| 2,852,075 A | 9/1958 | Wilson | |
| 4,028,614 A | 6/1977 | Kelley, Jr. | |
| 4,082,962 A | 4/1978 | Burgsdorf et al. | |
| 4,083,962 A * | 4/1978 | McDougald ................. | 424/114 |
| 4,085,338 A | 4/1978 | Genrikh et al. | |
| 4,119,866 A * | 10/1978 | Genrikh et al. ............. | 307/147 |
| 4,126,792 A | 11/1978 | Genrikh et al. | |
| 4,135,221 A * | 1/1979 | Genrikh et al. ................ | 361/1 |
| 4,190,137 A | 2/1980 | Shimada et al. | |
| 4,286,193 A * | 8/1981 | King et al. .................. | 315/175 |
| 4,317,076 A * | 2/1982 | Price .......................... | 323/210 |
| 4,322,632 A | 3/1982 | Hart et al. | |
| 4,489,270 A | 12/1984 | Diller | |
| 4,492,880 A | 1/1985 | Weiss | |

(Continued)

FOREIGN PATENT DOCUMENTS

EP  0 439 953 A2  8/1991

(Continued)

*Primary Examiner*—Chau N. Nguyen
*Assistant Examiner*—Daniel Cavallari
(74) *Attorney, Agent, or Firm*—Foley & Lardner LLP

(57) ABSTRACT

The switching apparatus and method are provided for varying the impedance of a phase line of a segment of an electrical power line. The phase line includes n conductors electrically insulated from each other and short-circuited among each other at two ends of the segment. The apparatus comprises, for each of at least one of the n conductors, a passive component and a pair of electromechanical and electronic switches, the pair of switches being able to connect and disconnect in a selective manner the passive component in series with the corresponding conductor, the switches of each pair being controllable independently. The apparatus also comprises a detecting device for detecting the current operating conditions of the phase line, and a control device for controlling each pair of switches according to the current operating conditions.

19 Claims, 17 Drawing Sheets

U.S. PATENT DOCUMENTS

| | | |
|---|---|---|
| 4,769,587 A | 9/1988 | Pettigrew |
| 4,999,565 A * | 3/1991 | Nilsson ................. 323/210 |
| 5,124,882 A | 6/1992 | Rosenberg |
| 5,260,862 A * | 11/1993 | Marsh ................... 363/39 |
| 5,483,030 A | 1/1996 | Bridges |
| 5,532,638 A * | 7/1996 | Kubo et al. ............. 327/368 |
| 5,734,256 A | 3/1998 | Larsen et al. |
| 5,754,045 A * | 5/1998 | Higuchi ................. 323/320 |
| 5,777,837 A | 7/1998 | Eckel et al. |
| 5,933,304 A * | 8/1999 | Irissou ..................... 361/8 |
| 6,018,152 A * | 1/2000 | Allaire et al. ............ 219/501 |
| 6,331,765 B1 * | 12/2001 | Yamamoto et al. ...... 323/210 |
| 6,359,423 B1 * | 3/2002 | Noro ..................... 323/208 |
| 6,385,547 B1 * | 5/2002 | Bogli ..................... 702/64 |
| 6,396,172 B1 * | 5/2002 | Couture ................. 307/125 |
| 6,411,067 B1 * | 6/2002 | Bjorklund ............... 323/207 |
| 6,486,569 B2 * | 11/2002 | Couture .................. 307/98 |
| 6,653,598 B2 * | 11/2003 | Petrenko et al. .......... 219/201 |
| 6,727,604 B2 * | 4/2004 | Couture ................. 307/112 |
| 6,900,619 B2 * | 5/2005 | Kehrli et al. ............. 323/207 |
| 7,157,812 B2 * | 1/2007 | Couture .................. 307/98 |
| 2005/0044298 A1 * | 2/2005 | Persson .................. 710/260 |

FOREIGN PATENT DOCUMENTS

| | | | |
|---|---|---|---|
| JP | 54015190 A | * | 2/1979 |
| SU | 593617 A | * | 8/1991 |
| WO | WO 00/35061 A1 | | 6/2000 |
| WO | WO 2004/032300 A1 | * | 4/2004 |

* cited by examiner

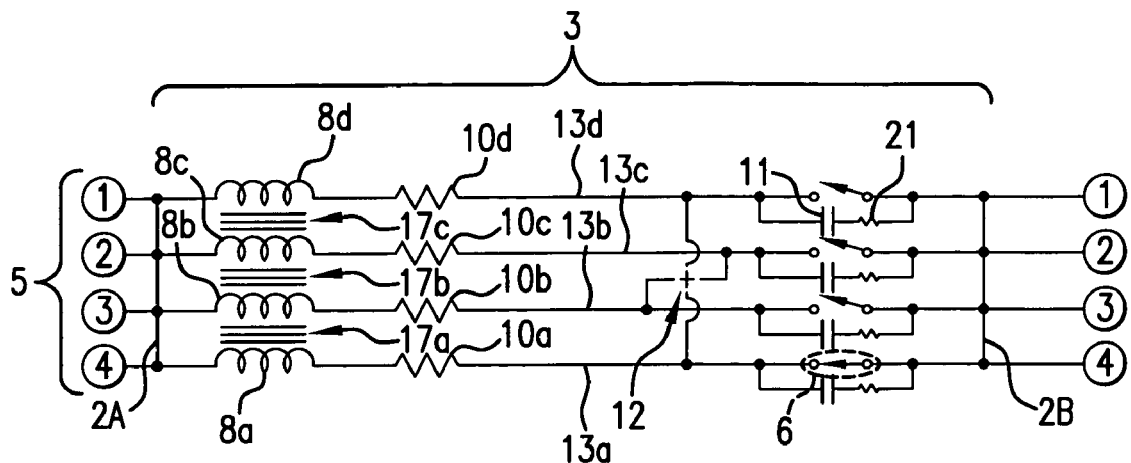
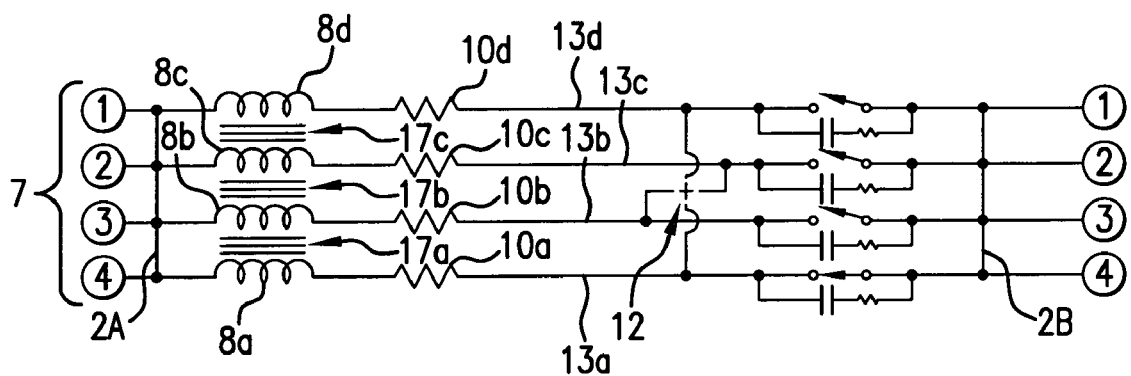
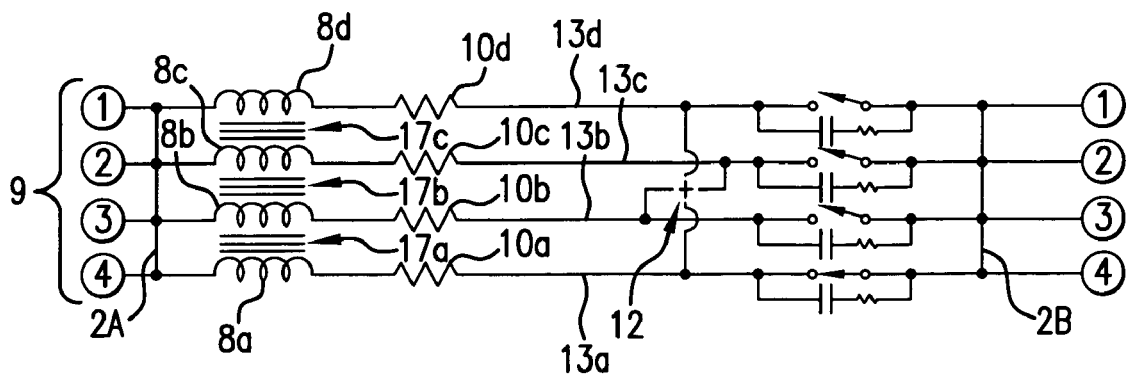
FIG.3

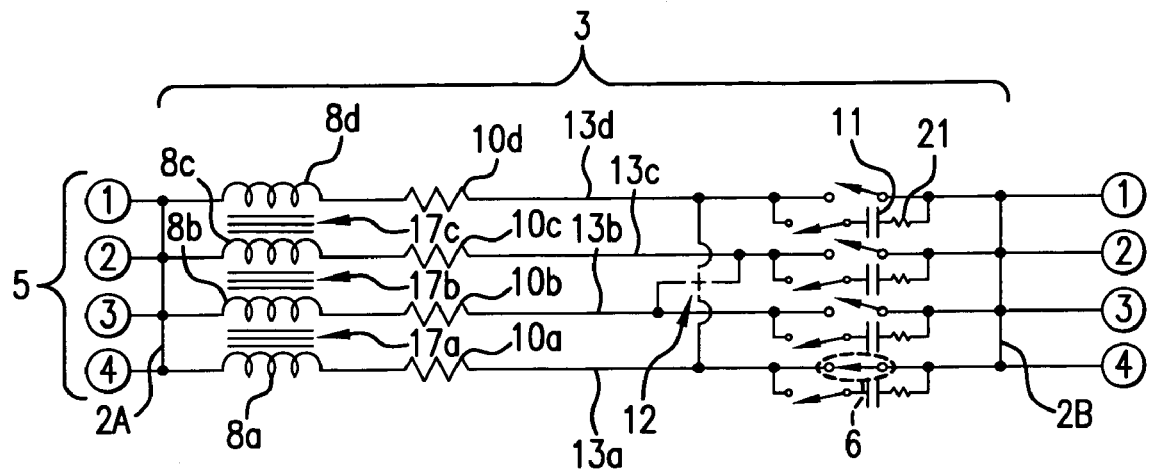
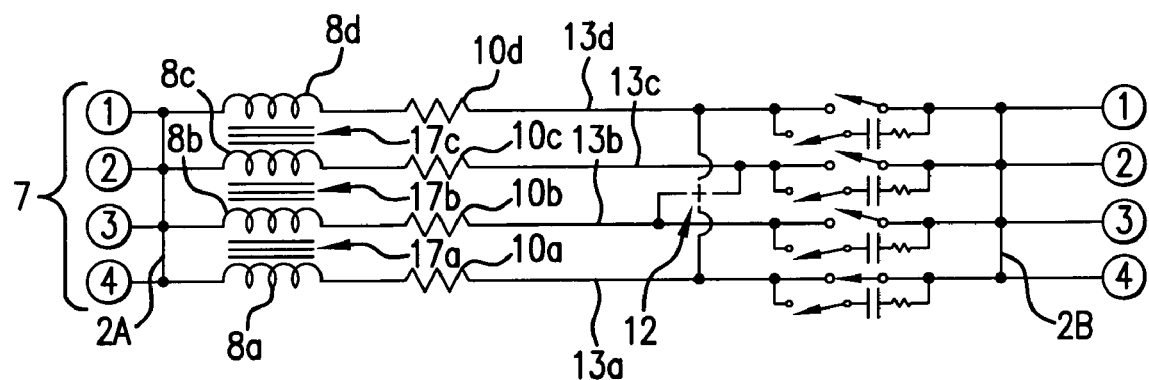
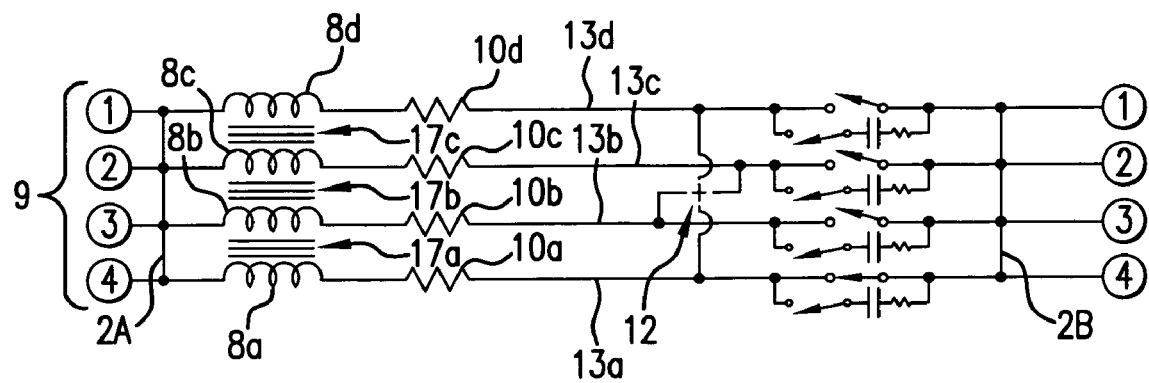
FIG.6

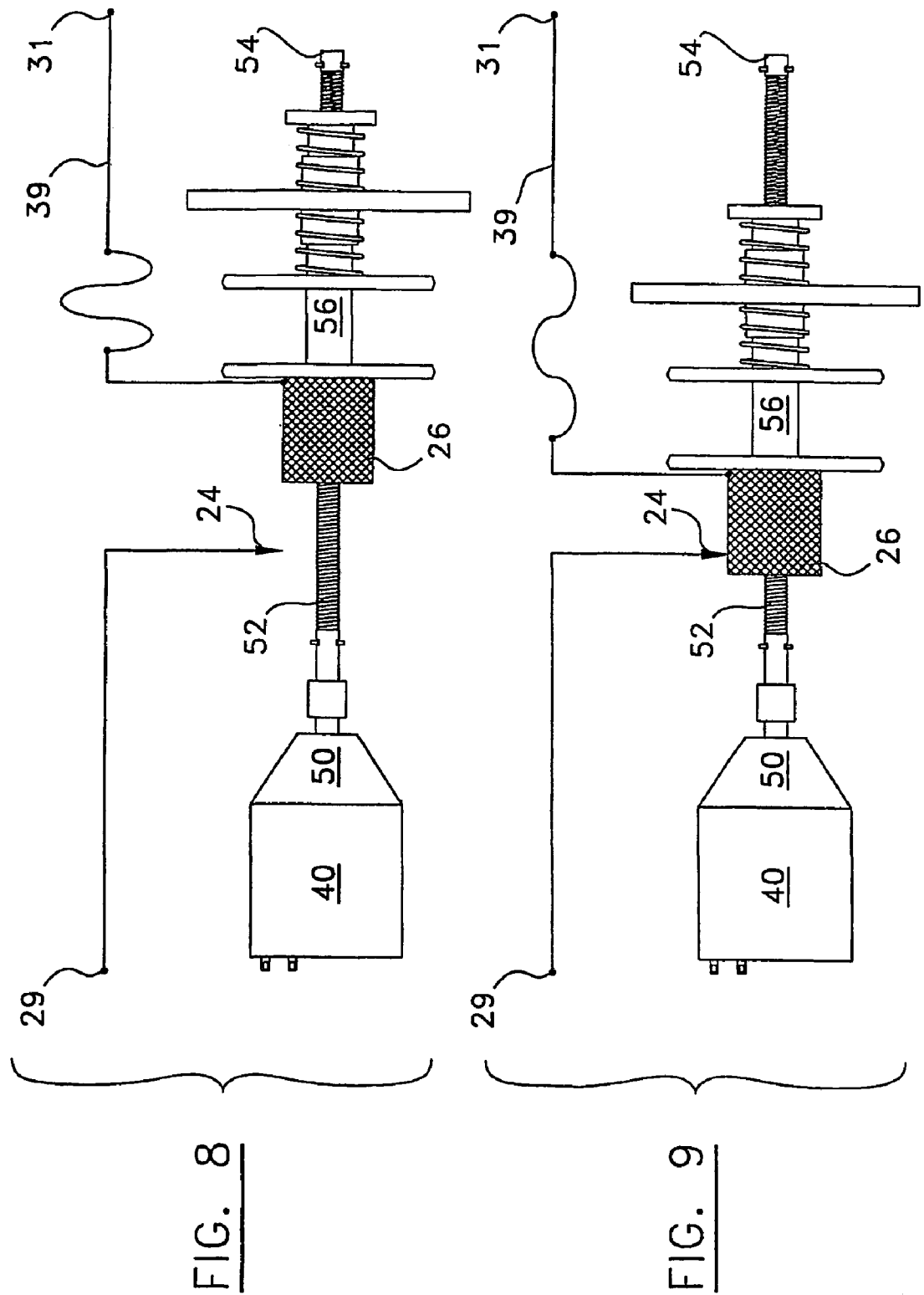

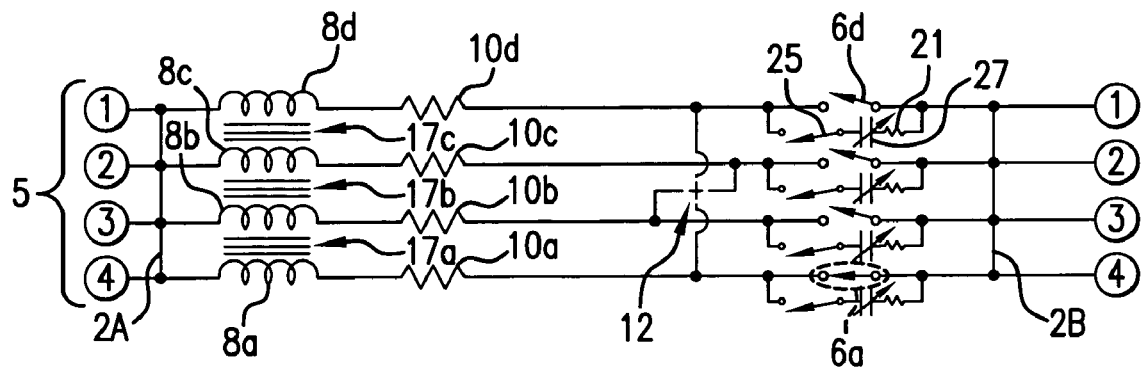
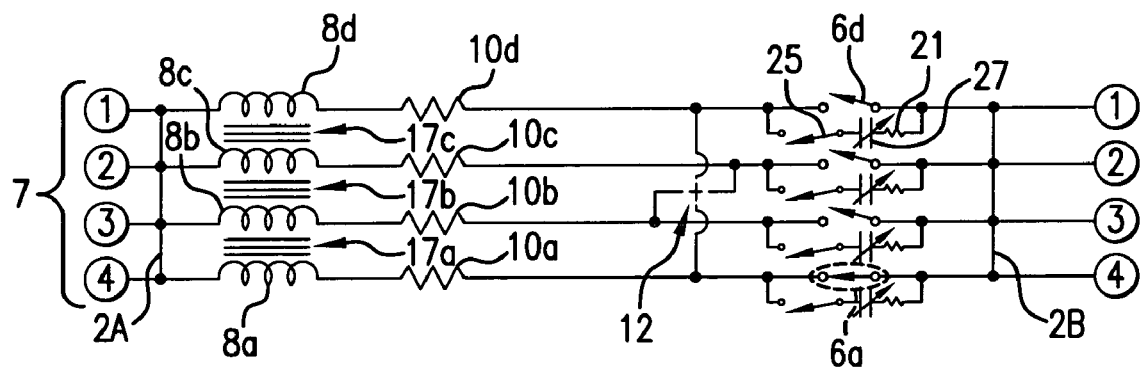
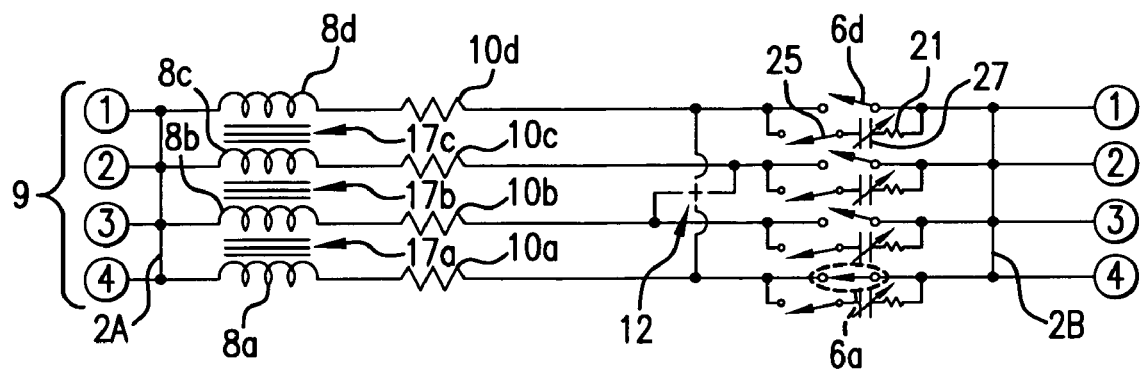
FIG. 10

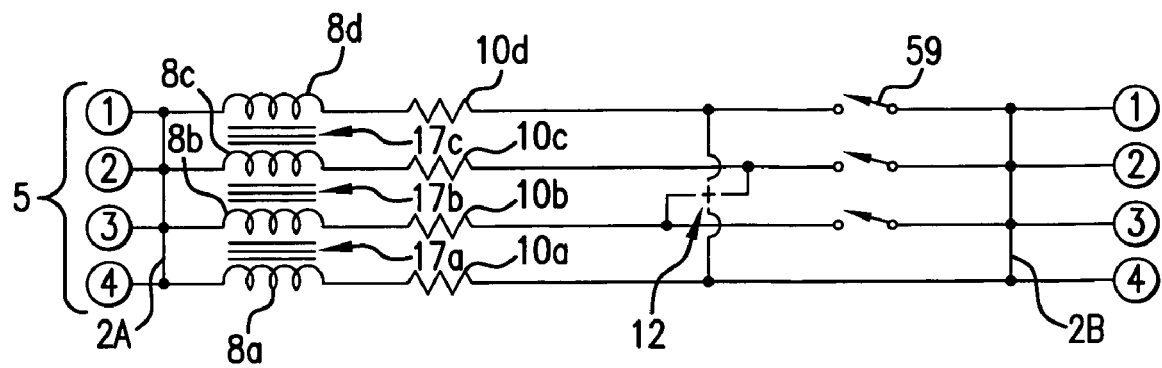
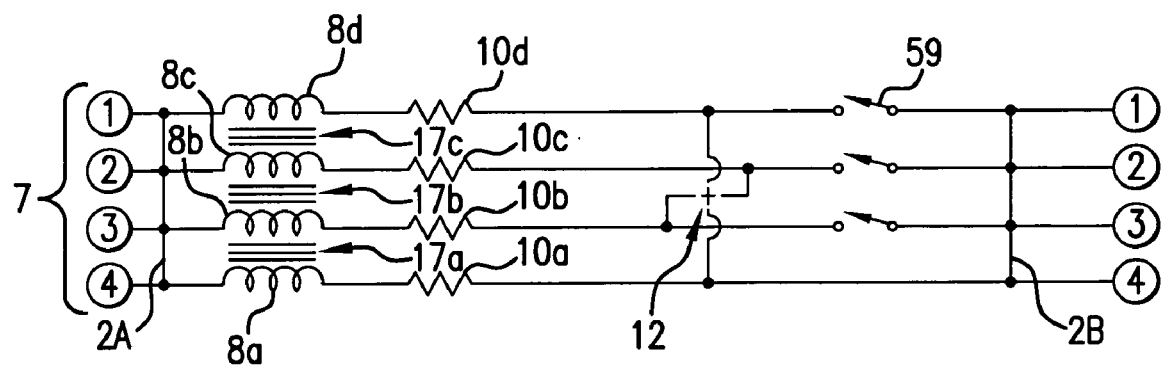
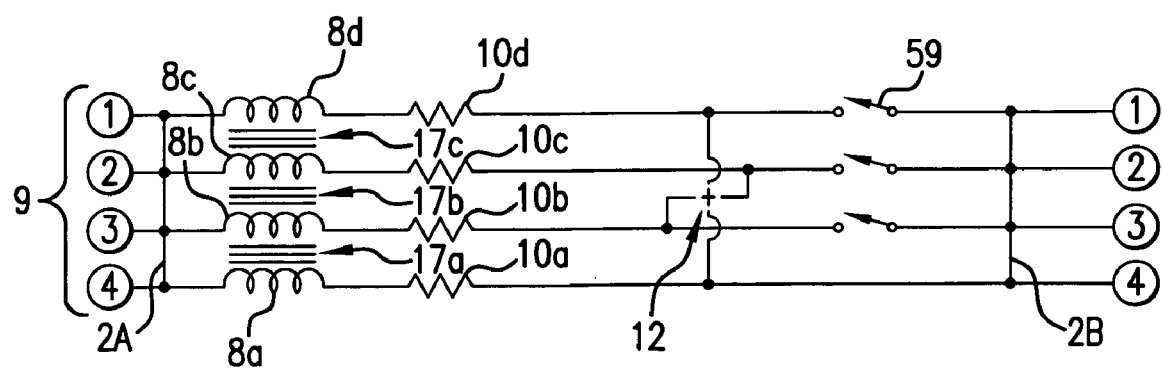
FIG. 13

SWITCHING APPARATUS AND METHOD FOR VARYING A PHASE LINE IMPEDANCE OF AN ELECTRIC POWER TRANSPORT LINE SECTION

The present invention relates to a switching apparatus and method for varying the impedance of a phase line of a segment of an electrical power line. In the present text, we will refer to "phase line" to describe what is commonly known by a person skilled in the art as "phase". The apparatus and method can be used, among other things, but not exclusively, for deicing an electrical power line, for modifying the power flow through an electrical power line in a static or a dynamic manner, for stabilizing a network of electrical power lines, for filtering harmonics from an electrical power line, for damping or dissipating energy transported by an electrical power line, or even for limiting the current of an electrical power line.

Known in the art, there is U.S. Pat. No. 2,797,344, granted on Jun. 25, 1957, and naming Mr. W. T. Peirce as inventor. This patent describes an apparatus for deicing electrical cables. This patent proposes that, in a power transmission line, a cable having a pair of conductors insulated from each other be provided. An electrical bridge is connected in series with one of the conductors. A means is provided for opening the electrical bridge, and another means is provided for operating the electrical bridge in response to ice accumulation on the cable. The electric bridge comprises a normally closed switch which is opened by the means that responds to an ice accumulation on the cable.

Also known in the art, there is U.S. Pat. No. 4,082,962, granted on Apr. 4, 1978, and naming as inventors Vladimir Vladimirovich BURGSDORF et al. This patent describes a device for melting the ice by direct current through conductors of an overhead power transmission line. This patent proposes the use of a rectifier that is temporarily connected to the end of one of the conductors of the line. The apparatus also comprises a grounding circuit as well as a circuit filter connected parallel to the rectifier. The circuit proposed in this patent uses a rectified current for deicing the line. For each section of the line, a rectifier, a grounding circuit and a circuit filter are used.

Also known in the art, there is U.S. Pat. No. 4,126,792 granted on Nov. 21, 1978, and naming as inventors Georgy A. GENRIKH et al. This patent proposes a high-voltage network for areas of increased intensity of icing. This patent proposes the use of a rectifier and a switching circuit for connecting at least one conductor of a line to the rectifier so as to melt the ice by a rectified current.

Also known in the art, there is U.S. Pat. No. 4,119,866 granted on Oct. 10, 1978, and naming as inventors Georgy Andreevich GENRIKH et al. This patent proposes the use of a direct current source and different switches connected to a segment of the line to allow a deicing of a conductor of a line by direct current.

Also known in the art, there is U.S. Pat. No. 4,190,137 granted on Feb. 26, 1980, and naming as inventors Akira SHIMADA et al. This patent describes an apparatus for deicing trolley wires. This patent proposes to form closed loops with different segments of the trolley feeding wires and to use certain types of transformers to circulate a current through the loops which is added to the feeding current to device the feeding wires.

Also known in the art, there are the following US patents which describe different apparatuses and methods for switching power lines for different applications: U.S. Pat. Nos. 2,240,772; 2,852,075; 4,028,614; 4,085,338; 4,135,221; 4,322,632; 4,489,270; 4,492,880; 4,769,587; 5,124,882; 5,483,030; 5,734,256; 5,777,837; and 5,754,045.

Hence, one of the drawbacks that is found in the set of switching apparatuses and methods mentioned above, resides in the fact that the strategies offered to a user for varying the impedance of a segment of an electrical power line including several phase lines are limited.

One of the objects of the present invention is to propose a switching apparatus and method for varying the impedance of a segment of an electrical power line with multiple conductors phase lines according to a range of possibilities which is much greater than what is possible in the prior art, in an efficient and safe manner.

The objects, advantages and other features of the present invention will become more apparent upon the reading of the following non-restrictive description of different preferred embodiments given for exemplification only in reference to the accompanying drawings.

SUMMARY OF THE INVENTION

According to the present invention, there is provided a switching apparatus for varying the impedance of a phase line of a segment of an electrical power line, the phase line including n conductors electrically insulated from each other and short-circuited among each other at two ends of the segment, the apparatus comprising:

for each of at least one of the n conductors, a passive component and a pair of electromechanical and electronic switches connected in parallel to each other, the pair of switches being able of connecting and disconnecting in a selective manner the passive component in series with the corresponding conductor in response to control signals, the switches of each pair being controllable independently;

detecting means for detecting current operating conditions of the phase line; and control means for controlling each pair of switches according to the current operating conditions detected by the detecting means.

According to another aspect of the present invention, there is also provided a switching apparatus for varying the impedance of a phase line of a segment of an electrical power line, the phase line including n conductors electrically insulated from each other and short-circuited among each other at two ends of the segment, the apparatus comprising:

for each of at most n–1 of the n conductors, an electronic switch able of opening or closing in a selective manner the corresponding conductor in response to control signals;

detecting means for detecting current operating conditions of the phase line; and control means for controlling the electronic switch according to the current operating conditions detected by the detecting means.

According to another aspect of the present invention, there is also provided a switching method for varying the impedance of a phase line of a segment of an electrical power line, the phase line including n conductors electrically insulated from each other and short-circuited among each other at two ends of the segment, the method comprising the following steps:

(a) detecting current operating conditions of the phase line; and (b) controlling pairs of electromechanical and electronic switches connected in parallel to each other according to the current operating conditions detected in step (a) for connecting and disconnecting in a selective manner at least one passive component connected respectively in series with at least one of the n conductors in response to control signals, the switches of each pair being controllable independently.

According to another aspect of the present invention, there is also provided a switching method for varying the impedance of a phase line of a segment of an electrical power line, the phase line including n conductors electrically insulated from each other and short-circuited among each other at two ends of the segment, the method comprising the following steps:

(a) detecting current operating conditions of the phase line; and (b) controlling electronic switches according to the current operating conditions detected in step (a) for opening or closing in a selective manner at most n−1 of the n conductors in response to control signals.

BRIEF DESCRIPTION OF THE DRAWINGS

FIG. 3 is a schematic circuit diagram illustrating a segment of a three-phased line provided with switches according to a preferred embodiment of the present invention.

FIG. 6 is a schematic circuit diagram illustrating a segment of a three-phased line provided with switches according to a preferred embodiment of the present invention.

FIG. 8 is a partial and schematic side view of a preferred embodiment of a component illustrated in FIG. 7, in a first position, according to the present invention.

FIG. 9 is a schematic and partial side view of the component shown in FIG. 8 in a second operating position, according to the present invention.

FIG. 10 is a schematic circuit diagram illustrating a segment of a three-phased line provided with switches according to a preferred embodiment of the present invention.

FIG. 11 is a schematic circuit diagram illustrating a segment of a three-phased line provided with switches according to the preferred embodiment of the present invention.

FIG. 12 is a schematic circuit diagram illustrating a segment of a three-phased line provided with switches according to a preferred embodiment of the present invention.

FIG. 13 is a schematic circuit diagram illustrating a segment of a three-phased line provided with switches according to a preferred embodiment of the present invention.

DETAILED DESCRIPTION OF THE DRAWINGS

Figure 1:
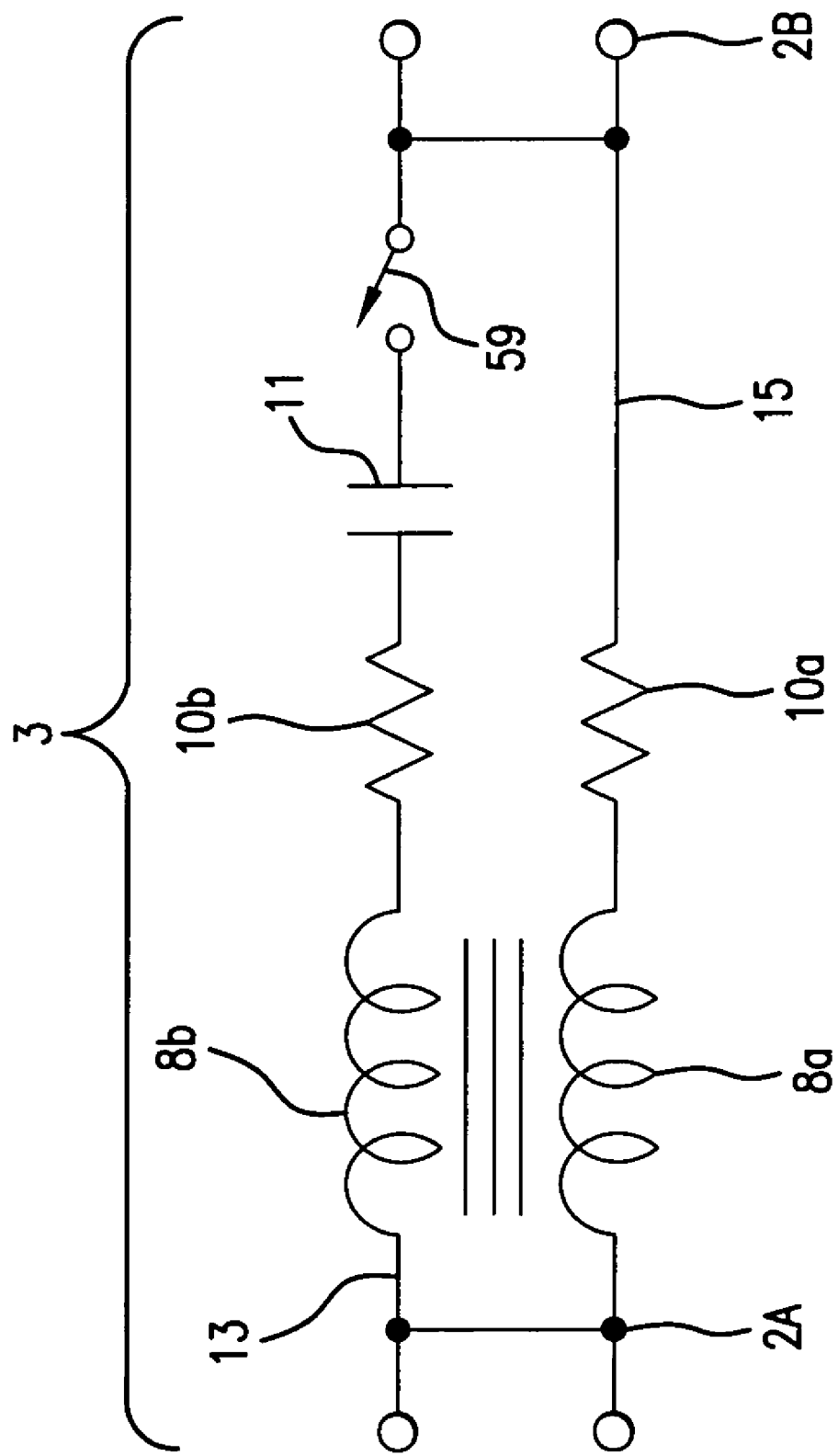
FIG. 1 is a schematic circuit diagram illustrating a phase line provided with a switch according to a preferred embodiment of the present invention.

Referring now to FIG. 1, there is shown a phase line of a segment 3 of an electrical power line which usually includes other phase lines (not shown). In the present case, the phase line shown includes two conductors 13 and 15 electrically insulated from each other and short-circuited among each other at two ends of the segment 3 by means of short-circuits 2A, 2B. A circuit equivalent to the self-inductance $8a$, $8b$, the mutual inductance 17 and the resistance $10a$, $10b$ is indicated. For the sake of discussion, the capacitive effects of the line are neglected. The apparatus comprises an electronic switch 59 which could be also a pair of electromechanical and electronic switches connected in parallel, and a passive component which in the present case is a capacitor 11. The switch 59 and the capacitor 11 are connected in series with the conductor 13 of the phase line. The other conductor 15 of the phase line is simply a short-circuit. The simplified representation of a phase line shown in FIG. 1 enables to understand that by opening and by closing the switch 59, one can vary the impedance of the segment 3 of the electrical power line. A person skilled in the art will also understand that the present configuration shows the components of an RLC circuit (resistance, inductance and capacitor), and that the value of the capacitor 11 can be chosen according to the frequency of operation for obtaining the desired impedance.

The addition of the capacitor 11 in series with the conductor 13 enables to increase the current in one of both conductors 13 and 15 of the phase line to a value greater than the current of the phase line which is the sum of the currents passing in the conductors 13 and 15 of the phase line, so as to, for example, promote deicing. Thus, the deicing of a conductor of a phase line is possible even when the current in the phase line is smaller than the deicing current required. It is possible to pass in the conductor the deicing current required even if the current of the phase line would have a value located for example between the deicing current and half thereof. The inductance of the line constitutes the component of an RLC circuit.

The addition of a capacitor in series with the conductor 13 enables also to change the impedance of the line, that is, to increase or decrease the impedance of the line according to the value of the capacitor. This enables to control the power flow in the line. This change of impedance enables to transfer power from one line to another. The addition of one or several apparatuses according to the present invention on several segments of a phase line enables to increase the desired effect on the power line. With an appropriate distribution of apparatuses according to the present invention in a line network and a control in real time of the impedance of the phase lines, one can increase the stability of the network and consequently the flow capacity of the lines.

An apparatus according to the present invention provided with a capacitor enables to carry out FACTS "flexible alternative current transmission systems" by using the self-inductance and the mutual inductance of the conductors of the phase line as a component of an RLC circuit. This embodiment and those that will be described in the present application enable to carry out FACTS without reference to the mass and without requiring physical space in a transformer station, which represents an important economical advantage. The appropriate sequence of switching of the switches of the apparatus enables to obtain the desired effect. The use of the inductance of the line with a capacitor connected on the line enables to reduce the costs of the FACTS.

The apparatus according to the present invention provided with a capacitor enables also to filter the harmonics on a direct current transmission line with multiple conductors phase lines. By means of several apparatuses according to the present invention, one can act on several phases simultaneously. The apparatus according to the present invention can be used for damping or dissipating energy by the addition of dissipation resistances to the outside of the housing of the apparatus and to the inside of the four conductors of a phase line on the side where the four conductors are connected to each other. Furthermore, the present invention can be used as a current limiter.

Figure 2:
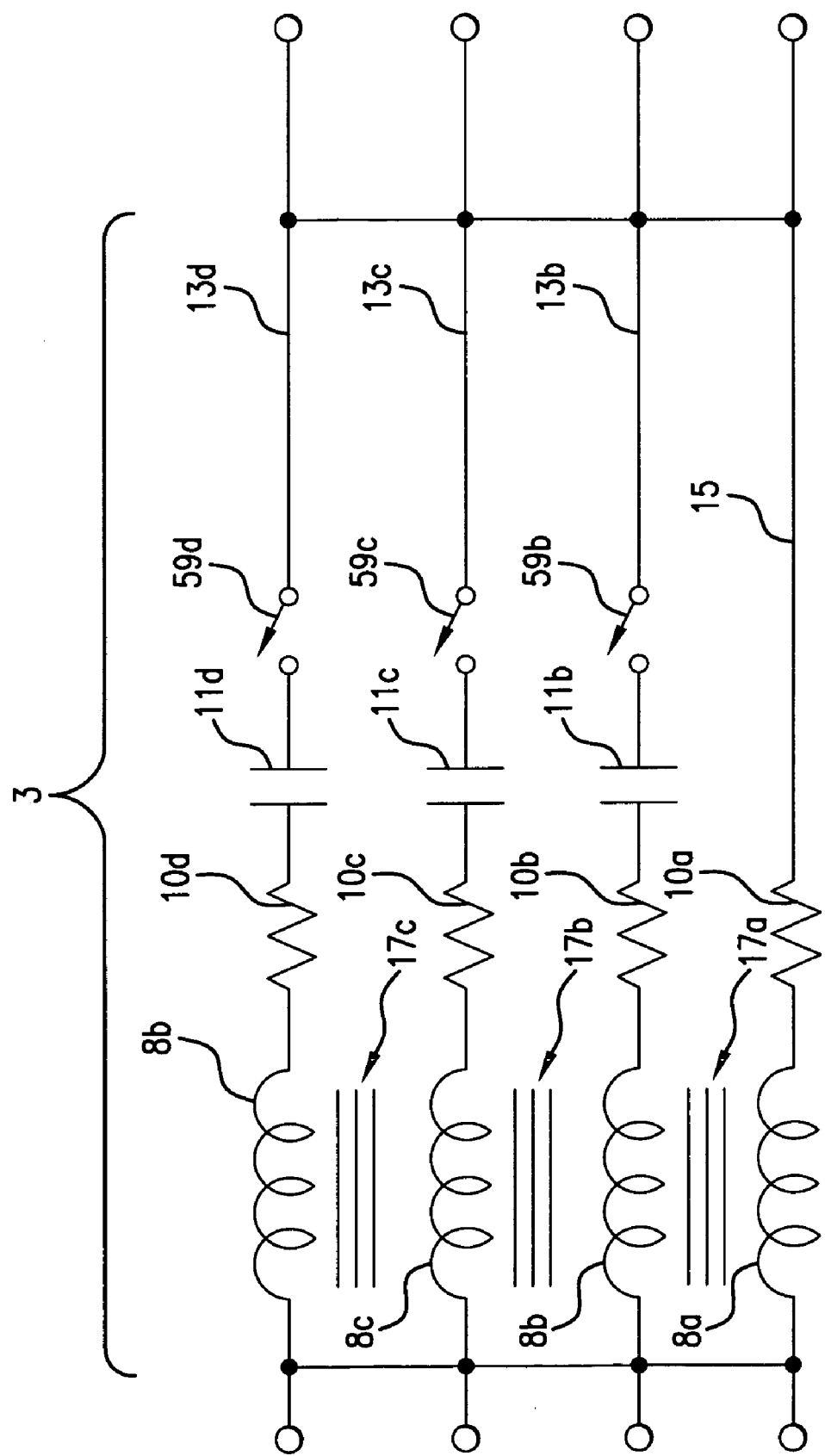
FIG. 2 is a schematic circuit diagram illustrating a phase line provided with switches according to a preferred embodiment of the present invention.

Referring now to FIG. 2, there is shown a phase line of a segment 3, including three conductors each provided with a switch 59b, 59c, 59d and a capacitor 11, and a fourth conductor 15 which is a short-circuit. A person skilled in the art will understand that the circuit shown in FIG. 2 offers a greater range of possibilities for varying the impedance of the phase line in comparison with the circuit shown in FIG. 1 since in this case three switches 59b, 59c, 59d can be activated.

Referring now to FIG. 3, there is shown a segment of an electrical power line provided with components according to a preferred embodiment of the present invention for varying the impedance of the phase lines of a segment. For example, the power line is a 735 kV three-phased line.

The electrical power line includes three phase lines 5, 7 and 9. Each of the phase lines 5, 7 and 9 includes several conductors 13a, 13b, 13c, 13d electrically insulated from each other for conducting the phase current. The conductors 13a, 13b, 13c, 13d of each phase line are short-circuited among each other at two ends of the segment 3 by means of short-circuits 2A, 2B.

Figure 4:
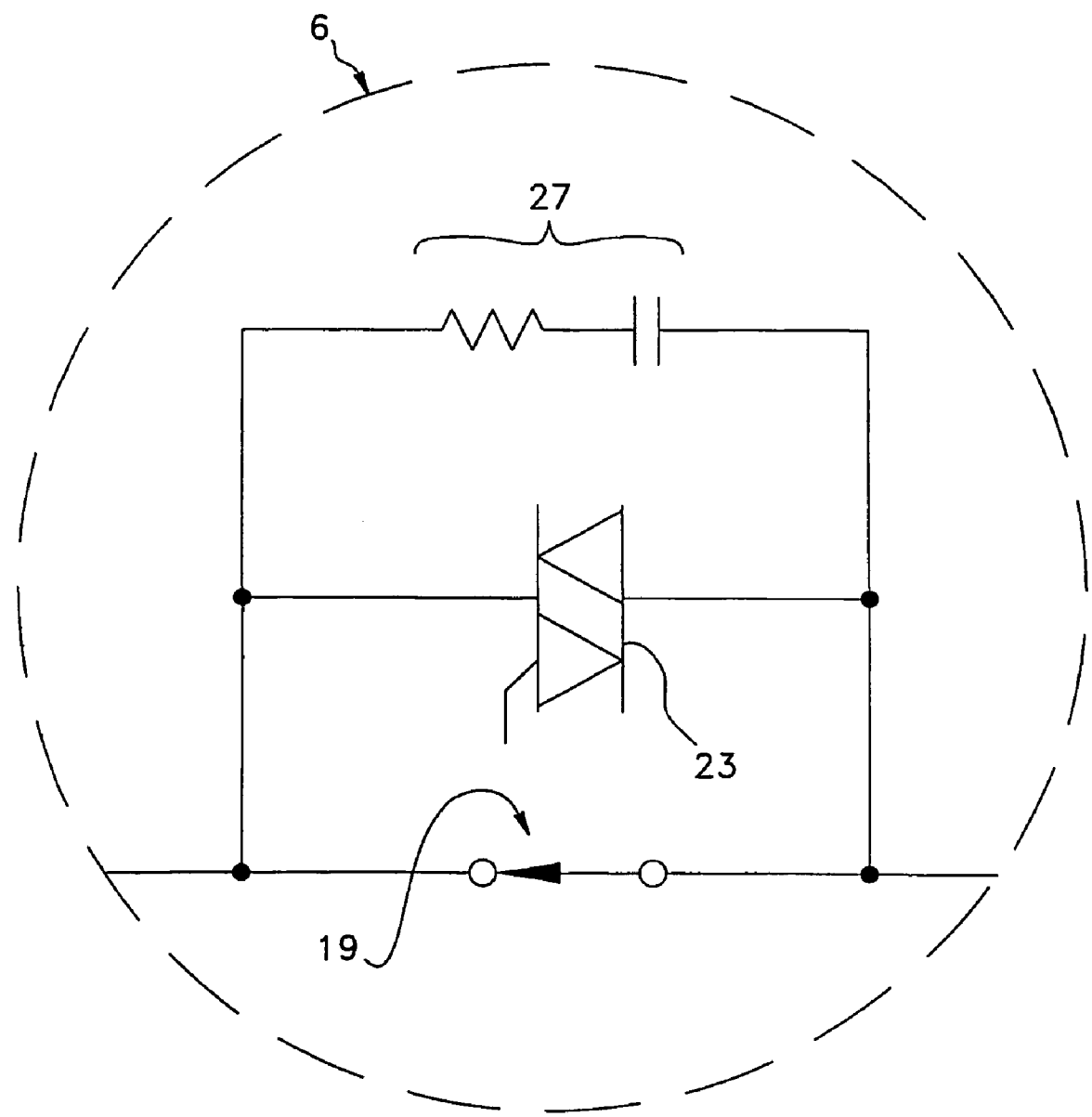
FIG. 4 is a circuit diagram illustrating a preferred embodiment of a component illustrated in FIG. 1, 2 or 3, according to the present invention.

In the present case, three apparatuses according to the present invention are respectively provided for the three phase lines 5, 7 and 9. For each conductor of a phase line 5, 7 or 9, the apparatus comprises a passive component preferably, in the present case, a capacitor 11, and a pair of electromechanical and electronic switches 6 connected in parallel to each other. However, it is not essential that all the conductors 13a, 13b, 13c, 13d of a phase line be provided with a passive component and a pair of switches. The pair of switches 6 can be carried out as shown in FIG. 4. Each pair of switches 6 is able to connect and disconnect in a selective manner the corresponding capacitor 11 in series with the corresponding conductor 13a, 13b, 13c 13d in response to control signals. The switches of each pair 6 are controllable independently as will be discussed in relation to FIG. 4.

In this FIG. 3, in order not to overload the figure, reference numbers 6, 11 and 21 have only been shown in relation to certain of the corresponding components that are shown in the upper portion of FIG. 3. However, it is to be understood that these reference numbers designate all the similar components that can be found in the three phase lines 5, 7 and 9. Thus, for each phase line 5, 7 or 9, four capacitors 11 and four pairs of switches 6 are provided for the four conductors 13a, 13b, 13c, 13d. Each pair of switches 6 is connected in series with the corresponding conductor 13. Each capacitor 11 is connected in parallel with the corresponding pair of switches 6. There is also shown that each capacitor 11 is connected in series with a bleeder resistance 21 which is of low value. Thus, each conductor 13 can be closed for forming a short-circuit by closing its pair of switches 6 or can be put in series with a corresponding capacitor by opening its pair of switches 6. As can be noticed, the different operating modes mentioned above are possible on each of the conductors of each of the phase lines 5, 7 and 9. There results thus a great room for manoeuvre for varying the impedance of phase lines of the segment 3.

Standard surge arresters 12 which can be semi-conductor voltage clamps such as avalanching diodes or varistors, are provided for protecting the insulators from the yoke plates and from the spacers during a current overload of the line which could induce an overvoltage between the conductors of a same phase line.

The apparatus also comprises a detecting device for detecting the current operating conditions of the corresponding phase line. This detecting device is carried out preferably by the circuit shown in FIG. 5.

The apparatus also comprises a control device for controlling each pair of switches 6 of a same phase line according to the current operating conditions detected by the detecting device. A preferred embodiment of this control device will be described in relation to FIG. 5.

For security reasons, the electromechanical switches of the pairs of switches of a same phase line 5, 7 or 9 are activated by a common mechanism which does not enable that all the electromechanical switches of a same phase line be opened simultaneously so as to never open a phase line.

According to the preferred embodiment, the present invention can be used for managing the power flow in a segment of an electric power line by varying the impedance of phase lines with the pairs of switches 6. For example, in order to change the power flow of a loop of a 735 kV transmission line fed by lines originating from distant dams, it suffices to modify the operating position of the pairs of switches of the switching apparatuses associated to the phase lines in order to also modify the power flow. To this effect, one can permanently open electromechanical switches of predetermined pairs of switches associated to predetermined phase lines, and use the electronic switches of said pairs of predetermined switches for opening and closing the corresponding conductors and thus control in real time the power flow and stabilize the electrical network with a fine and active control.

A change of the impedance on different lines produces a different power flow. There is a great number of combinations possible according to the state in which one places the different pairs of switches. The above-described application turns out to be very useful for carrying out an active stabilisation of the network by dynamic control of the power flow.

Referring now to FIG. 4, there is shown how are carried out the pairs of switches 6. The pair of switches 6 comprises an electronic switch 23 in parallel with an electromechanical switch 19 for forming a pair of electromechanical and electronic switches 6. According to a preferred embodiment, the electronic switch 23 is used for allowing the transitions of the corresponding electromechanical switch and is dependent on the same. However, according to another preferred embodiment, one can use the electronic switch 23 for taking over from the electromechanical switch 19 if the latter, following a problem, remains in an opened position for certain conductors of the phase line.

The electronic switch 23 is provided with a damper 27 and a protection circuit not shown. The electronic switch 23 is used when one wants to switch the electromechanical switch in a way to suppress the voltage at the terminals of the electromechanical switch during the switching. When a closing signal is sent to the pair of switches 6, the electronic switch 23 closes before the electromechanical switch, and when an opening signal is sent, the electromechanical switch 19 opens before the electronic switch 23. The electronic switch 23 can be for example a thyristor, triac, GTO, MOSFET, IGBT, etc.

To accomplish a control of the power flow, the electronic switch 23 must be able to be controlled by a control coming from the outside through a control device. This control device enables to change in real time the power flow of the network by dynamically changing the impedance of the lines, by uniquely controlling the electronic switches 23 after having opened the electromechanical switches 19 on certain conductors. This control can be carried out from a central unit which analyzes the power flow and sends appropriate signals to different control devices for opening or closing, in a dynamical system, the different electronic switches.

Figure 5:
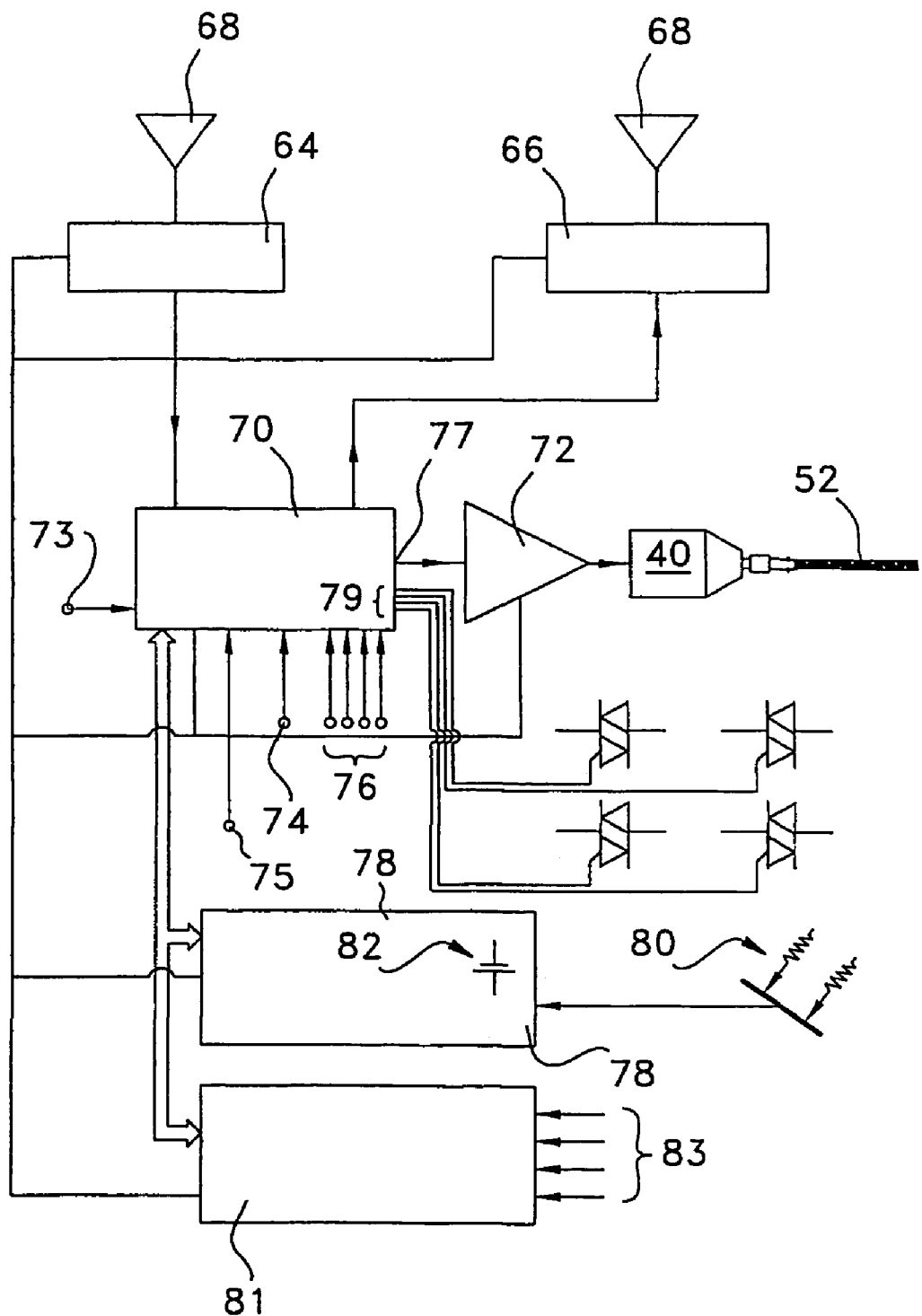
FIG. 5 is a block diagram of an apparatus according to a preferred embodiment of the present invention, in relation with FIG. 3.

Referring now to FIG. 5, there is shown a preferred embodiment of an apparatus according to the present invention which namely comprises a control device and a detecting device for controlling the pairs of switches of one of the phase lines shown in FIG. 3. The apparatus comprises a processor 70 having an input port 74 for receiving signals indicative of the operating positions of the electromechanical switches, input ports 76 for receiving signals indicative of the voltages at the terminals of the pairs of switches, an input port 73 for receiving signals indicative of the phase current in the phase line, an input port 75 for counting the turns of the lead screw 52, and outputs 77 or 79 for generating control signals. The unit also comprises a radiofrequency transmitter 66 connected to the processor 70 for transmitting signals indicative of the operating positions of the switches, of the voltages at the terminals of the pairs of switches, of the number of turns carried out by the lead screw, and of the phase current in the phase line. A radiofrequency receiver 64 is also provided. The receiver 64 and the transmitter 66 are respectively provided with an antenna 68. The receiver 64 is connected to the processor 70 for receiving radiofrequency control signals from which the control signals are produced. The unit also comprises an amplifier 72 connected to the processor 70 for controlling the motor 40 according to the control signals. The amplifier 72 and the motor 40 are connected to the command of the electromechanical portion of the pairs of switches 6 shown in FIGS. 3 and 4.

An electric power supply device is provided for supplying the processor 70, the receiver 64, the transmitter 66 and the amplifier 72. This electric power supply device comprises a first electric power supply source 78 including a battery 82 and a solar collector 80 connected to the battery 82. The electric power supply device also comprises a second electric power supply source 81 connected in parallel to the first electric power supply 78, and having inputs 83 connected to the conductors of the phase line. Thus, when one of the conductors is open, the supply can be provided from this conductor by means of the supply via one of the inputs 83.

The input port 75 is linked to a revolution counter of the lead screw 52 to know its position. The port 74 serves to receive a signal representative of the position of a carriage which is displaced by the lead screw 52. Each carriage regroups the set of electromechanical switches of the pairs of switches of the phase line. The position of the carriage is representative of the position of each of the electromechanical switches that are associated with it.

The receiver 64 and the transmitter 66 respectively enable to receive and transmit radiofrequency signals. The pairs of switches are activated according to the radiofrequency signals received. The radiofrequency signals transmitted by the transmitter 66 enable to confirm the reception of the control radiofrequency signals and eventually confirm their execution. The receiver 64 is permanently capable of receiving the radiofrequency signals from afar which are coded.

Referring now to FIG. 6, there is shown a circuit similar to the one shown in FIG. 3 with the exception of the fact that it comprises additionally pairs of electromechanical and electronic switches 25. It is thus possible to completely open a conductor 13 by opening the corresponding pairs of switches 6 and 25. For each conductor 13, a new possibility of variation of impedance is thus offered. These pairs of switches 25 can be carried out in a similar manner to the one shown in FIG. 4 but they could also be replaced by electronic switches. The switches of a pair of switches 25 are controlled independently as will be explained in relation to FIG. 7.

Figure 7:
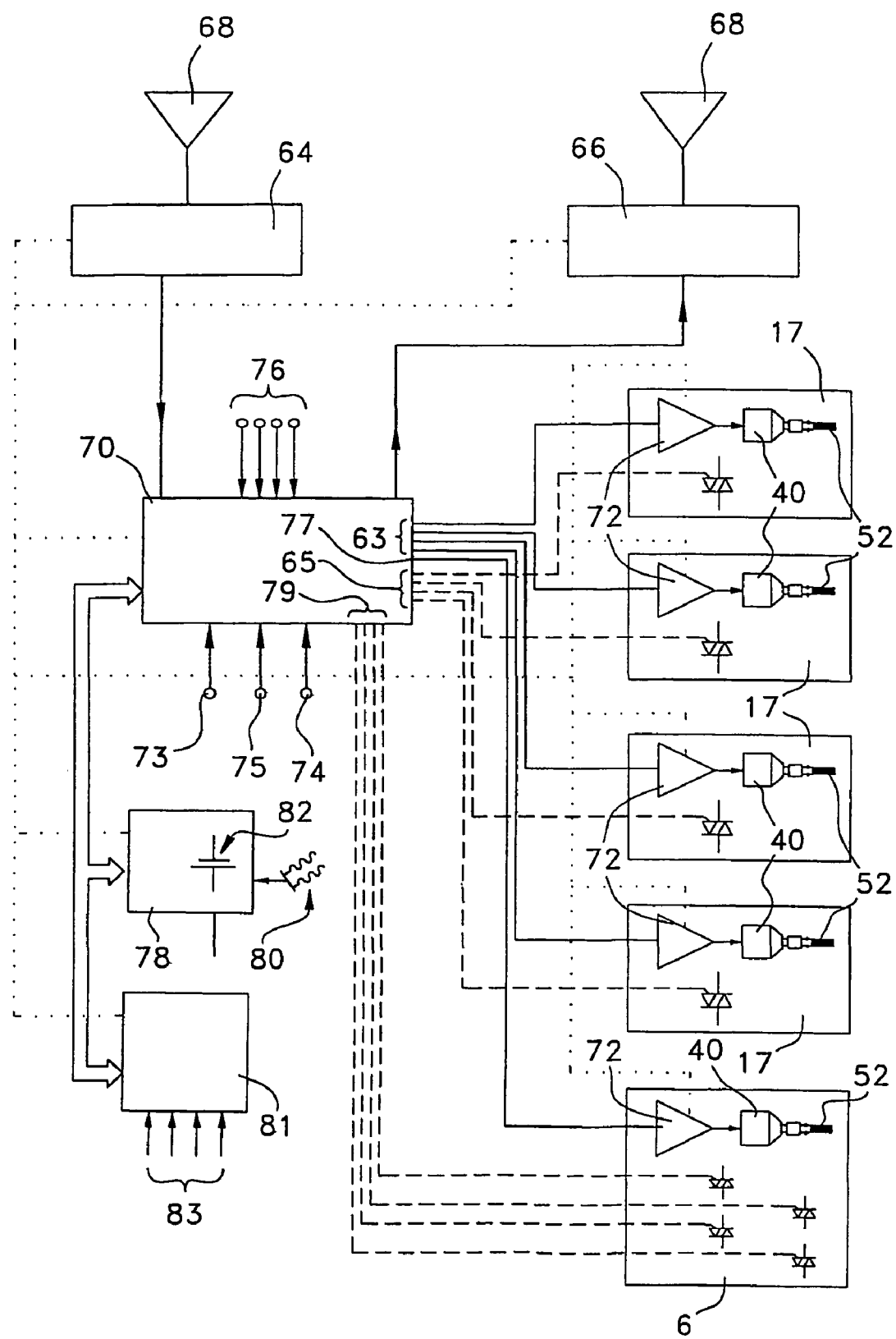
FIG. 7 is a block diagram of an apparatus according to a preferred embodiment of the present invention, in relation with FIG. 6.

Referring now to FIG. 7, there is shown a preferred embodiment of an apparatus according to the present invention which comprises a detecting device, a control device and the pairs of switches shown in FIG. 6.

The apparatus comprises a processor 70 having an input port 74 for receiving signals indicative of the operating positions of the electromechanical switches of the pairs of switches 6, input ports 76 for receiving signals indicative of the voltages at the terminals of the pairs of switches 6, an input port 73 for receiving signals indicative of the phase current of the phase line, an input port 75 for counting the turns of the lead screws 52, and outputs 63, 65, 77 and 79 for producing control signals.

The input port 75 is linked to a revolution counter of the lead screws 52 to know their position. The port 74 serves to receive a signal representative of the position of the carriage displaced by the lead screw 52 of the pairs of switches 6. The carriage regroups the set of electromechanical switches of the pairs of switches 6 of the phase line. The position of the carriage is thus representative of the position of each of the electromechanical switches that are associated with it.

The transmitter 66 that functions intermittently or continuously confirms the control received, the execution time of the control, the state of the batteries and the voltage in the conductors. The information relative to the voltage at the terminals of the opened conductor enables at the same time to determine the current that passes through the other conductors which are closed. A zone receiver and transmitter which are not illustrated are also provided for receiving data from a load cell (not shown) mounted on the phase line and for retransmitting the data received at a distance from the load cell to a central control post (not shown).

Referring now to FIGS. 8 and 9, there is shown a preferred embodiment of the electromechanical portion of the pairs of switches 25 shown in FIGS. 6 and 7 in opened and closed positions respectively. It consists of an electromechanical switch which comprises two terminals 29 and 31, and a cradle 56 able to be displaced along the lead screw 52. The cradle 56 comprises a contact of mobile conductors 26 having a conducting surface able to be connected with the conducting cursor 24.

A driving device is provided for displacing the cradle 56 by activating the lead screw 52. This driving device is controlled by the control device shown in FIG. 7. The driving device comprises a motor 40, and a speed reducer 50 coupled to the motor 40. The lead screw 52 has an extremity connected to the speed reducer 50, and another extremity 54 linked to an anchoring point in the housing (not shown). Flexible cables 39 connect the mobile conducting contact 26 to the terminal 31.

Referring now to the circuit shown in FIG. 10, there is shown a circuit similar to the one shown in FIG. 6 however, in this case, each of the capacitors is a capacitor 27 chargeable and controllable by the control device of the apparatus. Thus, the apparatus according to the present invention as shown in FIG. 10 enables much more possibilities of variations of the impedance of a phase line.

Figure 11:
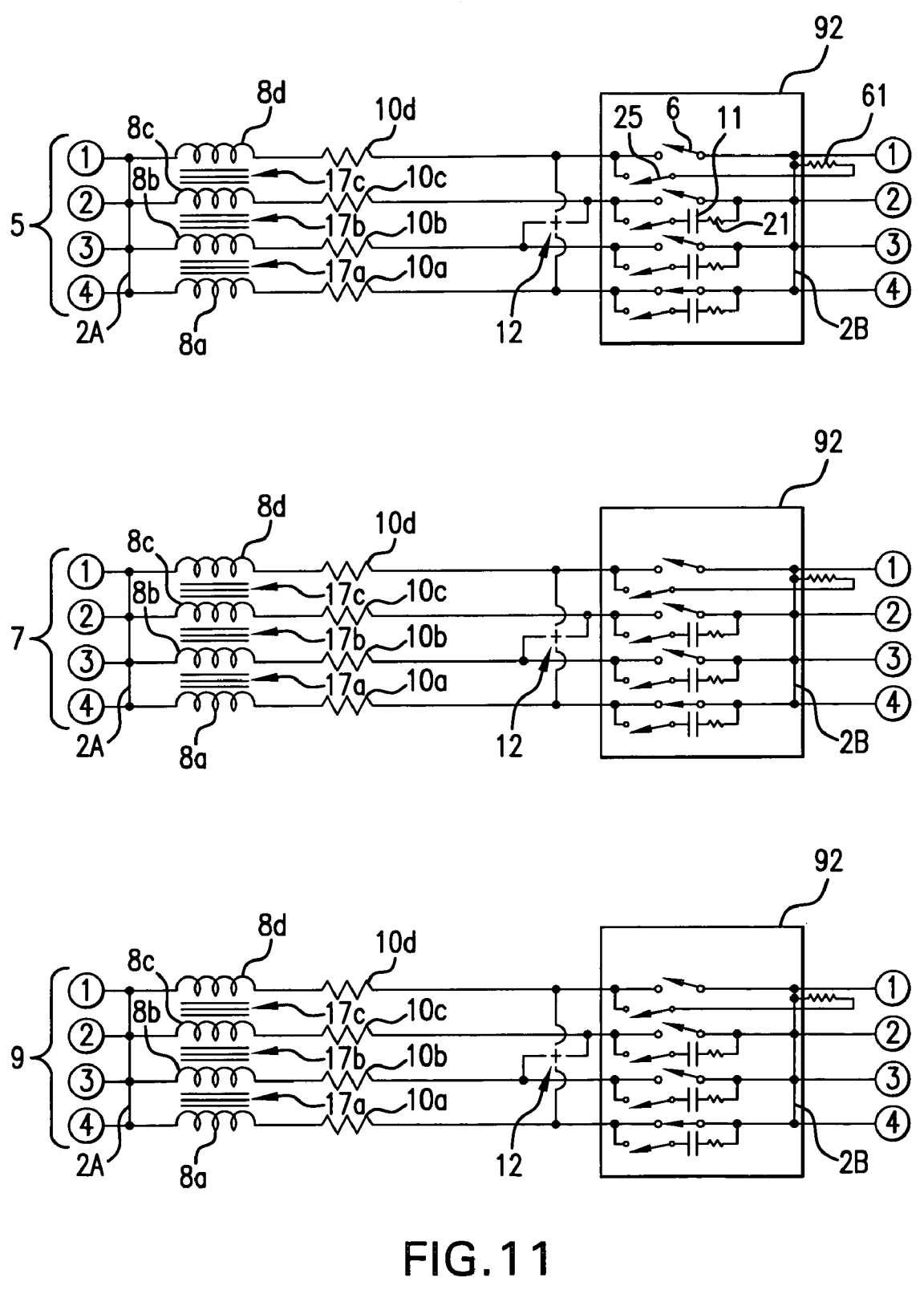
Figure 16:
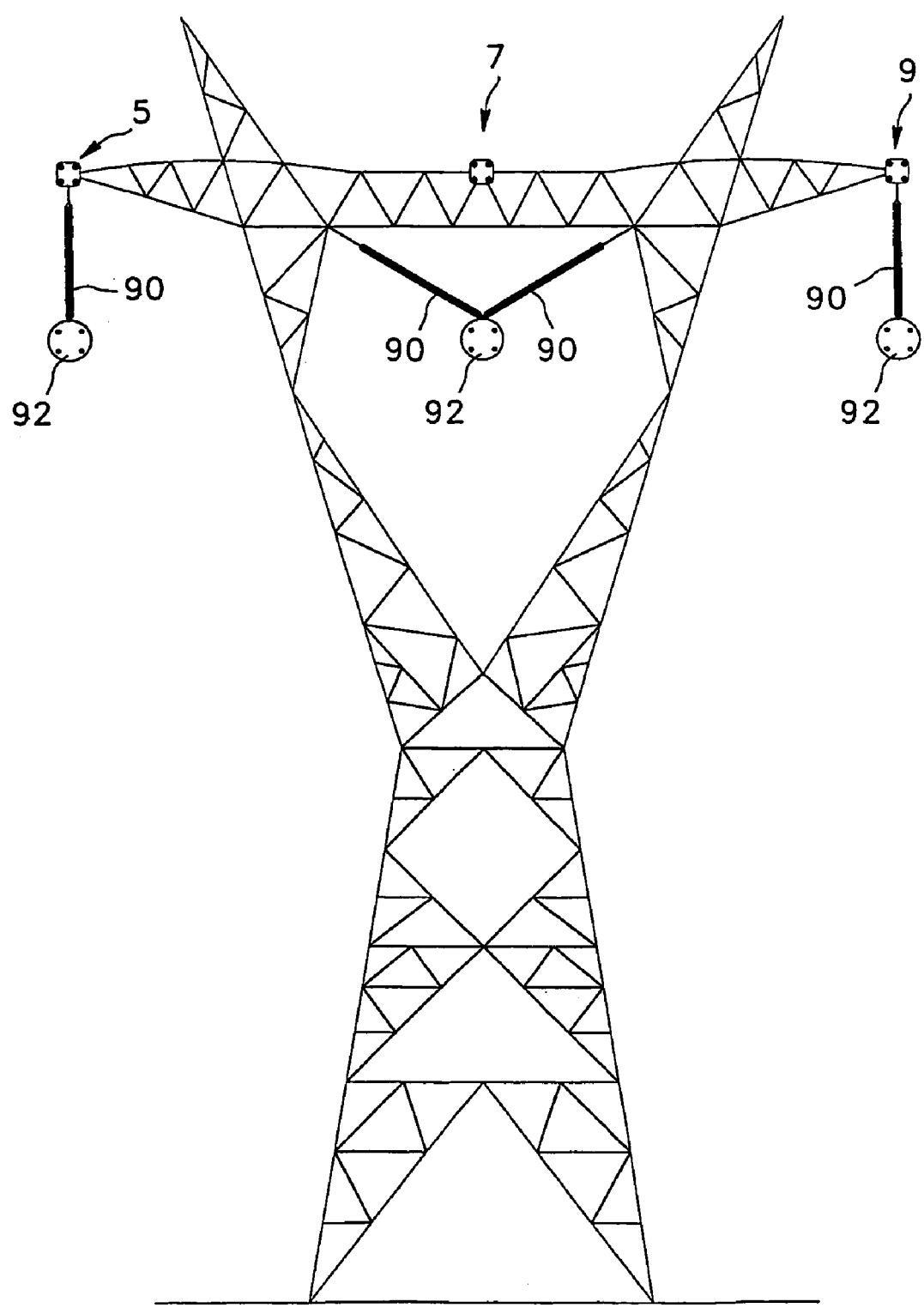
FIG. 16 is a front view of a tower supporting an electrical power line on which apparatuses according to a preferred embodiment of the present invention are mounted.
Figure 18:
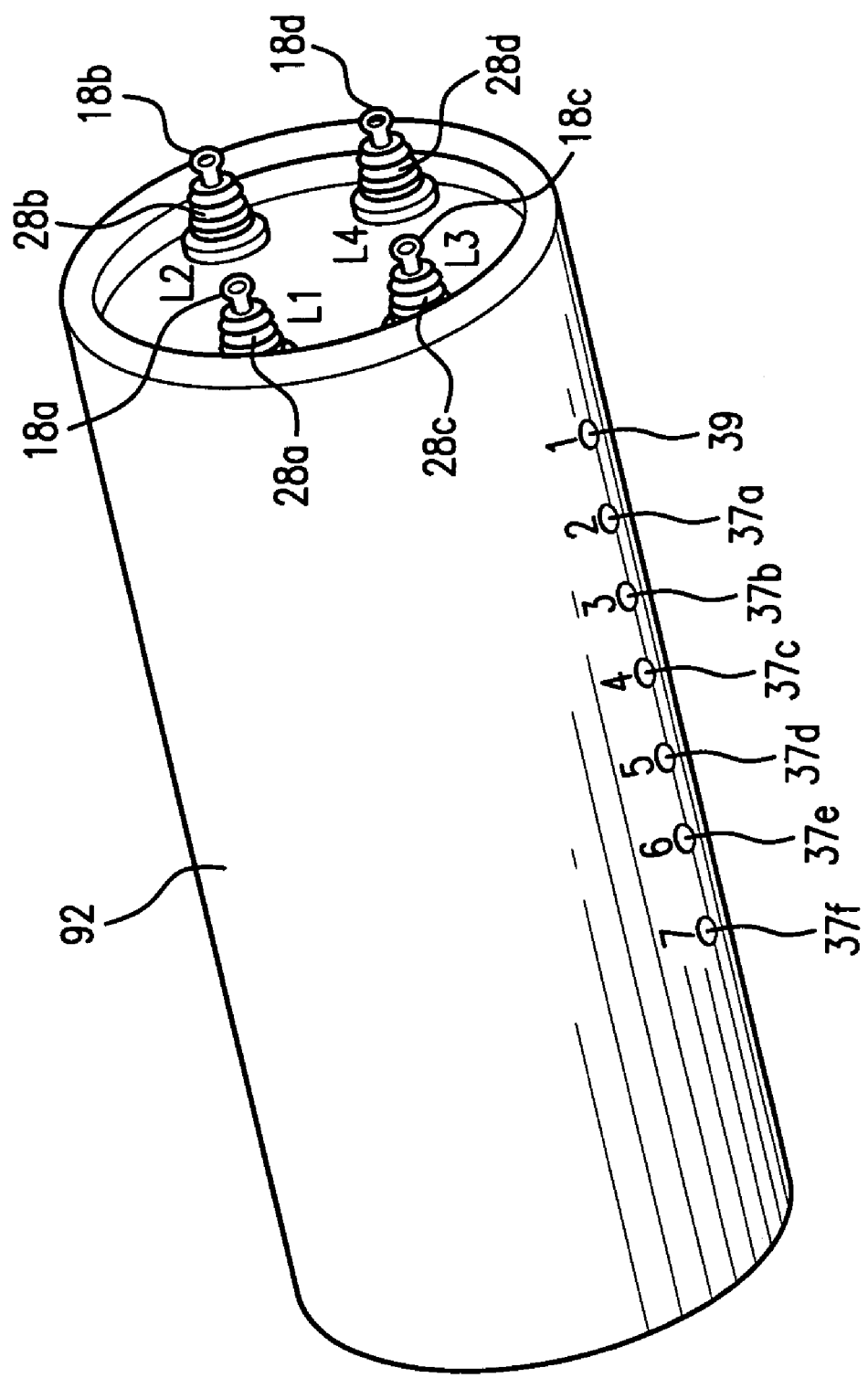
FIG. 18 is a perspective view of a component shown in FIGS. 16 and 17.

Referring now to FIGS. 11, 16 and 18, there is shown, according to a preferred embodiment of the present invention, the housings 92 of the apparatuses provided for containing each of the pairs of switches of a phase line, a detecting device and a control device. As can be seen more specifically in FIG. 11, for each phase line, four passive components 11 and 61 and four pairs of switches 6a, 6b, 6c, 6d are provided. Each pair of switches 6a, 6b, 6c, 6d is connected in series with the corresponding conductor. Each passive component 61 or 11 is connected in parallel with the corresponding pair of switches 6. The passive components provided on three of the four conductors are capacitors 11, whereas the passive component provided on the fourth conductor is a power resistance 61. The power resistance 61 has a terminal connected to an end of the segment where the conductors are short-circuited, and it is physically located inside of the volume delimited by the four conductors of the phase line, and outside of the corresponding housing 92. This preferred embodiment enables a switching with a damper.

Figure 12:
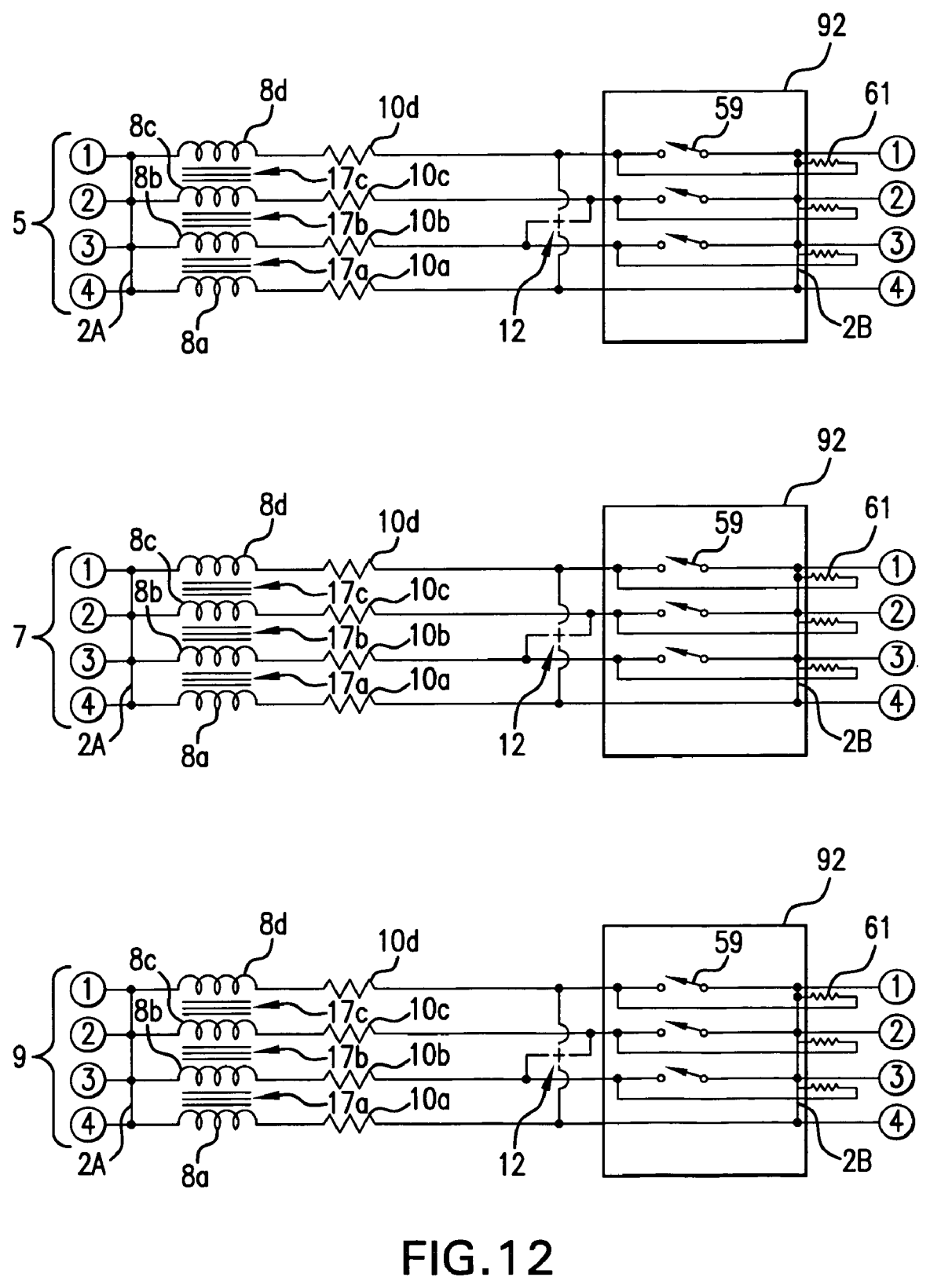

Referring now to FIG. 12, there is shown another preferred embodiment according to the present invention. According to this embodiment, each apparatus comprises for each of at most three of the four conductors of a phase line, an electronic switch 59 able to open and close in a selective manner the corresponding conductor in response to control signals. Each apparatus also comprises a detecting device and a control device which will be described in greater details in relation to FIG. 15. Furthermore, each apparatus comprises a housing 92 for containing electronic switches 59, a detecting device and a control device. According to this embodiment, for each phase line, three electronic switches 59 are provided for three of the four conductors of a phase line. For each of the three conductors, the electronic switch is connected in series with the corresponding conductor, and a power resistance 61 is connected in parallel with the corresponding electronic switch 59. Each power resistance 61 has a terminal connected to an end 2B of the segment where the conductors are short-circuited. Each power resistance 61 is physically located inside of the volume delimited by the four conductors of the corresponding phase line and outside of the housing 92. This device accomplishes a damping circuit.

Referring now to FIG. 13, there is shown a configuration which carries out a limiting current circuit. This configuration is similar to the one shown in FIG. 12 however, there is no power resistance connected in parallel with the electronic switches 59. A person skilled in the art will easily understand that by activating the switches 59, one can limit the current that passes through each phase line.

Figure 14:
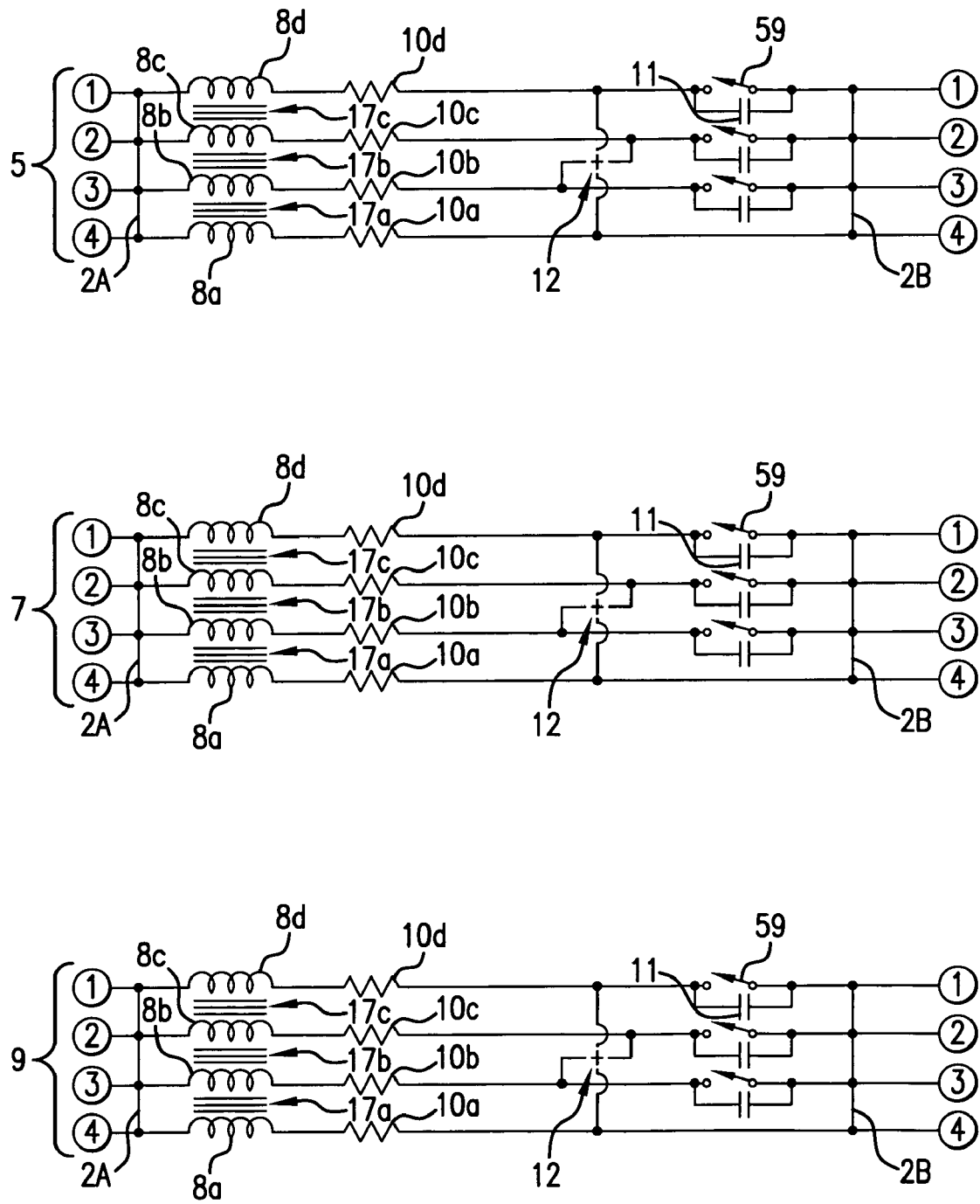
FIG. 14 is a schematic circuit diagram illustrating a segment of a three-phased line provided with switches according to a preferred embodiment of the present invention.

Referring now to FIG. 14, there is shown a configuration which accomplishes a current limiting circuit with a capacitor. This configuration is similar to the one shown in FIG. 12 however, capacitors 11 replace the power resistances. A person skilled in the art will easily understand that by activating the switches 59 one can limit the current passing through each of the phase lines.

Figure 15:
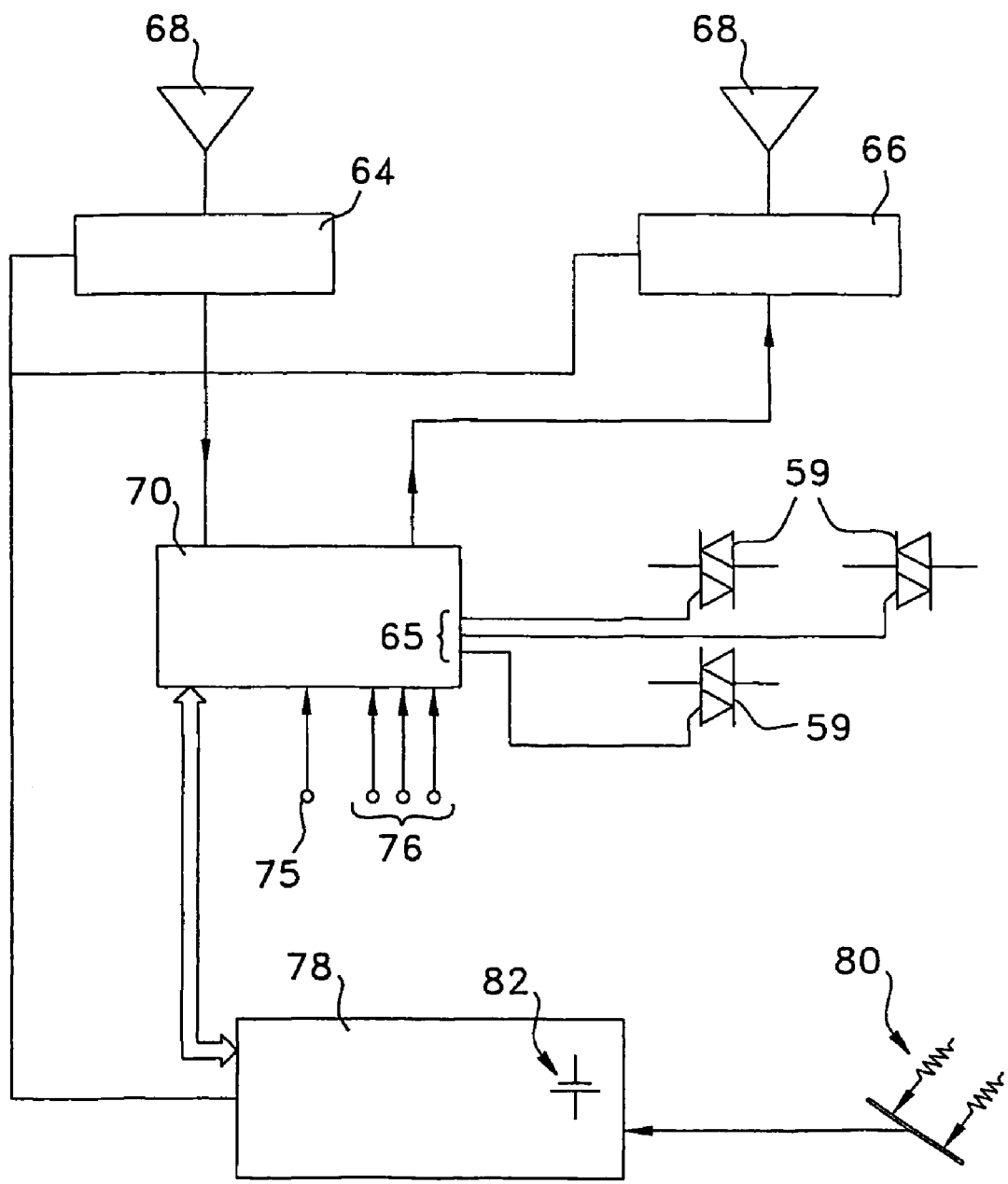
FIG. 15 is a block diagram of an apparatus according to a preferred embodiment of the present invention, in relation with FIGS. 12, 13 and 14.

Referring now to FIG. 15, there is shown a preferred embodiment of an apparatus according to the present invention for controlling the electronic switches 59 shown in FIGS. 12, 13, and 14. The apparatus comprises three electronic switches 59, a detecting device and a control device.

The processor 70 has input ports 76 for receiving signals indicative of voltages at the terminals of the electronic switches, and an input port 75 for receiving signals indicative of the phase current in the phase line. The detecting device comprises a radiofrequency transmitter 66 connected to the processor 70 for transmitting signals indicative of the voltages at the terminals of the electronic switches 59 and of the phase current, and an electric power supply source 78 for supplying the processor 70 and the transmitter 66. The control device comprises the processor 70 which includes, namely, outputs 65 for transmitting the control signals for controlling the electronic switches 59. The control device also comprises a radiofrequency receiver 64 connected to the processor 70 for receiving radiofrequency control signals from which control signals are produced, and the electric power supply source 78 for supplying the receiver 64 namely. The electric power supply source 78 comprises a battery 82 and a solar collector 80 connected to the battery 82.

Referring now to FIG. 16, there is shown a front view of a tower provided with apparatuses of which one can see the housings 92, according to the present invention. The housings 92 are supported by supports 90. Each housing 92 contains one of the apparatuses shown in FIGS. 5, 7 and 15.

Figure 17:
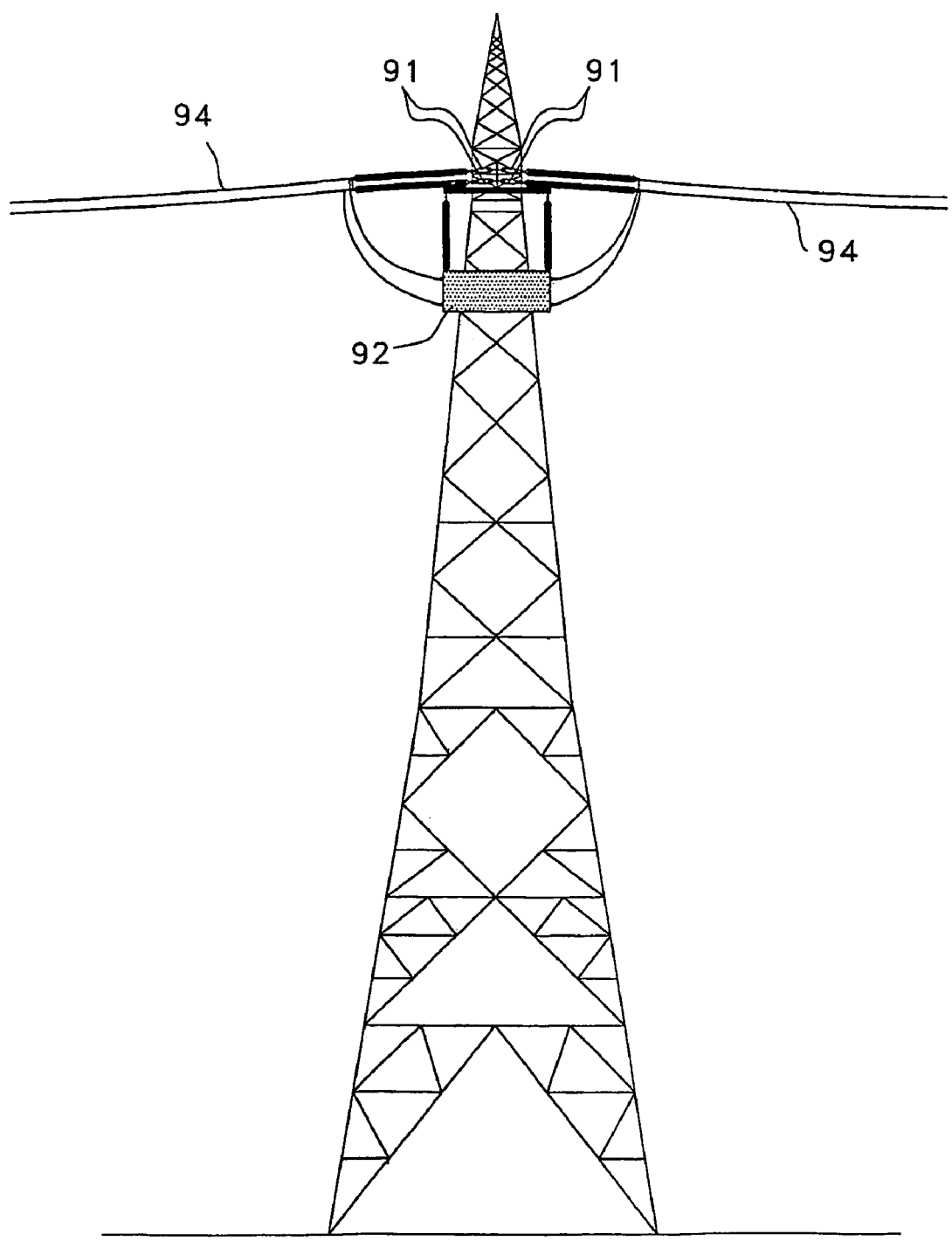
FIG. 17 is a side view of the tower shown in FIG. 16.

Referring now to FIG. 17, there is shown a side view of the tower shown in FIG. 16. On this FIG. 17, one can see that the housings 92 do not have to support the mechanical load which is present in the power transmission line. Furthermore, one can see four load cells 91 which are mounted on the four phase lines.

Referring now to FIG. 18, there is shown a perspective view of one of the housings 92 shown in FIGS. 16 and 17. More particularly, the housing shown in FIG. 18 contains the apparatus shown in FIG. 7. One can see the switching terminals 18a, 18b, 18c, 18d of the apparatus, as well as transverse insulators 28a, 28b, 28c, 28d. One can also see openings 37a, 37b, 37c, 37d, 37e, 37f as well as an indicating ball 39 which serves to indicate the position of the electromechanical switches of the pairs of switches 6 to a technician present on the grounds.

The invention claimed is:

1. A switching apparatus for varying the impedance of a phase line of a segment of an electrical power line, the phase line including n conductors electrically insulated from each other and short-circuited among each other at two ends of the segment, n being an integer greater than one, the apparatus comprising:

at least one pair of electromechanical and electronic switches connected in parallel to each other, the switches of each pair being controllable independently by control signals;

detecting means for detecting current operating conditions of the phase line; and control means for controlling each pair of switches according to the current operating conditions detected by the detecting means, wherein, for at least one of the n conductors, the switching apparatus comprises a passive component, the pair of switches provided on the corresponding conductor of the electrical power line being able to connect and disconnect in a selective manner the passive component in series with the corresponding conductor of the phase line of the segment of the electrical power line, wherein the impedance of the phase line of the segment of the electrical power line is varied accordingly.

2. An apparatus according to claim 1, wherein each of the passive components is a capacitor.

3. An apparatus according to claim 2,
wherein the n conductors comprise n capacitors and n pairs of switches;
wherein the n pairs of switches are respectively connected in series with the n conductors; and
wherein the n capacitors are respectively connected in parallel with the n pairs of switches.

4. An apparatus according to claim 1, further comprising a housing for containing the pairs of switches, the detecting means and the control means,
wherein the n conductors comprise n passive components and n pairs of switches;
wherein the n pairs of switches are respectively connected in series with the n conductors;
wherein the n passive components are respectively connected in parallel with the n pairs of switches;
wherein a switch is connected in series with each of the passive components;
wherein the passive components provided for n−1 of the n conductors are capacitors; and
wherein the passive component provided for the $n^{th}$ conductor is a power resistance, the power resistance having a terminal connected to an end of the segment where the conductors are short-circuited, the power resistance being physically located inside of a three-dimensional space delimited by the n conductors and outside of the housing.

5. An apparatus according to claim 1,
wherein at most n−1 of the n conductors are respectively provided with one passive component and one pair of switches;
wherein the one pair of switches is respectively connected in series with the corresponding one of the n−1 conductors; and
wherein the one passive component is respectively connected in parallel with the corresponding one pair of switches.

6. An apparatus according to claim 5, wherein each of the passive components is a power resistance.

7. An apparatus according to claim 5, wherein each of the passive components is a capacitor.

8. An apparatus according to claim 3, wherein each capacitor is connected in series with a bleeder resistance.

9. An apparatus according to claim 3, further comprising:
additional switches connected respectively in series with the capacitors, each of the switches being controllable by the control means.

10. An apparatus according to claim 9,
wherein each of the additional switches comprises a pair of electromechanical and electronic switches connected in parallel and controllable independently by the control means.

11. An apparatus according to claim 9,
wherein each of the capacitors is a variable capacitor controllable by the control means.

12. An apparatus according to claim 4,
wherein each of the switches comprises a pair of electromechanical and electronic switches connected in parallel and controllable independently by the control means.

13. An apparatus according to claim 1,
wherein the detecting means comprises:
a processor having a first input port for receiving signals indicative of the operating positions of the pairs of switches, second input ports for receiving signals indicative of the voltages at the terminals of the pairs of switches, and a third input port for receiving signals indicative of the phase current;
a radiofrequency transmitter connected to the processor for transmitting signals indicative of the operating positions of the electromechanical switches of the pairs of switches, of the voltages at the terminals of the pairs of switches and of the phase current; and
electric power supply means for supplying power to the processor and the transmitter;
wherein the control means comprises:
the processor which further includes outputs for transmitting the control signals for controlling all the pairs of electromechanical and electronic switches;
a radiofrequency receiver connected to the processor for receiving radiofrequency control signals from which the control signals are produced; and
the electric power supply means for supplying power to the receiver and an amplifier.

14. A switching apparatus for varying the impedance of a phase line of a segment of an electrical power line, the phase line including n conductors electrically insulated from each other and short-circuited among each other at two ends of the segment, n being an integer greater than one, the apparatus comprising:
electronic switches controllable by control signals,
detecting means for detecting current operating conditions of the phase line, and
control means for controlling the electronic switches according to the current operating conditions detected by the detecting means,
wherein each of at most n−1 of the n conductors of the phase line of the segment of the electrical power line comprises one of the electronic switches, said electronic switch being able to open or close in a selective manner the corresponding conductor of the phase line of the segment of the electrical power line,
wherein the impedance of the phase line of the segment of the electrical power line is varied accordingly.

15. An apparatus according to claim 14, further comprising a housing for containing the electronic switches, the detecting means and the control means,
wherein the n−1 conductors comprise n−1 electronic switches;
wherein the n−1 electronic switches are respectively connected in series with the n−1 conductors; and
wherein a power resistance is connected in parallel with each of the n−1 electronic switches, the power resistance having a terminal connected at one end of the segment where the conductors are short-circuited, the power resistance being physically located inside of a three-dimensional space delimited by the n conductors and outside of the housing.

16. An apparatus according to claim 14,
wherein the detecting means comprises:
a processor having first input ports for receiving signals indicative of the voltages at the terminals of the electronic switches, and a second input port for receiving signals indicative of the phase current;

a radiofrequency transmitter connected to the processor for transmitting signals indicative of the voltages at the terminals of the electronic switches, and of the phase current; and electronic power supply means for supplying power to the processor and the transmitter;

wherein the control means comprises:

the processor which further includes outputs for transmitting the control signals for controlling the electronic switches;

a radiofrequency receiver connected to the processor for receiving radiofrequency control signals from which the control signals are produced; and the electric power supply means for supplying power to the radio frequency receiver.

17. A switching method for varying the impedance of a phase line of a segment of an electrical power line, the phase line including n conductors electrically insulated from each other and short-circuited among each other at two ends of the segment, n being an integer greater than one, the method comprising:

(a) detecting current operating conditions of the phase line; and (b) controlling pairs of electromechanical and electronic switches connected in parallel to each other according to the current operating conditions detected in step (a), the switches of each pair being controllable independently by control signals, wherein, in step (b), for each of at least one of the n conductors of the phase line of the segment of the electrical power line, one of the pairs of switches is controlled for connecting in series and disconnecting in a selective manner a passive component that is provided on the phase line of the segment of the electrical power line, wherein the impedance of the phase line of the segment of the electrical power line is varied accordingly.

18. A switching method for varying the impedance of a phase line of a segment of an electrical power line, the phase line including n conductors electrically insulated from each other and short-circuited among each other at two ends of the segment, n being an integer greater than one, the method comprising:

(a) detecting current operating conditions of the phase line; and (b) controlling electronic switches according to the current operating conditions detected in step (a), the switches being controllable by control signals, wherein, in step (b), for each of at most n−1 of the n conductors of the phase line of the segment of the electrical power line, one of the electronic switches is controlled for opening or closing in a selective manner the corresponding conductor of the phase line of the segment of the electrical power line, wherein the impedance of the phase line of the segment of the electrical power line is varied accordingly.

19. A switching apparatus for varying the impedance of a phase line of a segment of an electrical power line, the phase line including n conductors electrically insulated from each other and short-circuited among each other at two ends of the segment, n being an integer greater than one, the apparatus comprising:

at least one pair of electromechanical and electronic switches connected in parallel to each other, the switches of each pair being controllable independently by control signals;

a detecting unit configured to detect current operating conditions of the phase line; and a control unit configured to control each pair of switches according to the current operating conditions detected by the detecting unit, wherein, for each of at least one of the n conductors of the phase line of the segment of the electrical power line, one of the pairs of switches is controlled for connecting in series and disconnecting in a selective manner a passive component that is provided on the phase line of the segment of the electrical power line, wherein the impedance of the phase line of the segment of the electrical power line is varied accordingly.

* * * * *